US008100657B2

(12) United States Patent
Riaz et al.

(10) Patent No.: US 8,100,657 B2

(45) Date of Patent: Jan. 24, 2012

(54) STEAM TURBINE ROTATING BLADE FOR A LOW PRESSURE SECTION OF A STEAM TURBINE ENGINE

(75) Inventors: Muhammad Saqib Riaz, Niskayuna, NY (US); Qingxuan Michael Zhang, San Diego, CA (US)

(73) Assignee: General Electric Company, Schenectady, NY (US)

( * ) Notice: Subject to any disclaimer, the term of this patent is extended or adjusted under 35 U.S.C. 154(b) by 771 days.

(21) Appl. No.: 12/205,941

(22) Filed: Sep. 8, 2008

(65) Prior Publication Data

US 2010/0061861 A1 Mar. 11, 2010

(51) Int. Cl.
*B64C 11/04* (2006.01)

(52) U.S. Cl. ................................ 416/212 A; 416/223 R

(58) Field of Classification Search .................. 416/192, 416/195, 212 A, 212 R
See application file for complete search history.

(56) References Cited

U.S. PATENT DOCUMENTS

| | | | |
|---|---|---|---|
| 4,260,331 A | 4/1981 | Goodwin | |
| 5,067,876 A | 11/1991 | Moreman, III | |
| 5,174,720 A | 12/1992 | Gradl | |
| 5,267,834 A | 12/1993 | Dinh et al. | |
| 5,277,549 A | 1/1994 | Chen et al. | |
| 5,299,915 A | 4/1994 | Dinh et al. | |
| 5,393,200 A | 2/1995 | Dinh et al. | |
| 5,480,285 A | 1/1996 | Patel et al. | |
| 5,494,408 A | 2/1996 | Seeley et al. | |
| 5,531,569 A | 7/1996 | Seeley | |
| 5,829,955 A | 11/1998 | Saito et al. | |
| 6,142,737 A | 11/2000 | Seeley et al. | |
| 6,435,833 B1 | 8/2002 | Reluzco et al. | |
| 6,435,834 B1 | 8/2002 | Reluzco et al. | |
| 6,499,959 B1 | 12/2002 | Reluzco et al. | |
| 6,568,908 B2 | 5/2003 | Namura et al. | |
| 6,575,700 B2 | 6/2003 | Arai et al. | |
| 6,652,237 B2 | 11/2003 | Yehle et al. | |
| 6,682,306 B2 | 1/2004 | Murakami et al. | |
| 6,814,543 B2 | 11/2004 | Barb et al. | |
| 6,846,160 B2 | 1/2005 | Saito et al. | |
| 6,893,216 B2 | 5/2005 | Snook et al. | |
| 7,097,428 B2 | 8/2006 | Barb et al. | |
| 7,195,455 B2 | 3/2007 | Stonitsch et al. | |
| 2002/0057969 A1* | 5/2002 | Namura et al. | 416/238 |
| 2003/0049131 A1* | 3/2003 | Murakami et al. | 416/241 R |
| 2004/0126235 A1 | 7/2004 | Barb et al. | |
| 2007/0292265 A1 | 12/2007 | Burdgick et al. | |
| 2009/0214345 A1 | 8/2009 | DeMania et al. | |

(Continued)

OTHER PUBLICATIONS

Jones, Office Action Communication for U.S. Appl. No. 12/205,942 dated Aug. 2, 2011, 11 pages.

(Continued)

*Primary Examiner* — Cheung Lee
(74) *Attorney, Agent, or Firm* — Hoffman Warnick LLC

(57) ABSTRACT

A steam turbine rotating blade for a low pressure section of a steam turbine engine is disclosed. The steam turbine rotating blade includes an airfoil portion. A root section is attached to one end of the airfoil portion. A dovetail section projects from the root section, wherein the dovetail section includes a tangential entry dovetail. A tip section is attached to the airfoil portion at an end opposite from the root section. A cover is integrally formed as part of the tip section. The blade includes an exit annulus area of about 18.1 $ft^2$ (1.68 $m^2$) or greater.

14 Claims, 3 Drawing Sheets

U.S. PATENT DOCUMENTS

2010/0021306 A1 1/2010 Mujezinovic et al.

OTHER PUBLICATIONS

Amir Mujezinovic, "Bigger Blades Cut Costs", Modern Power Systems, Feb. 2003, p. 25, 27.
Michael Boss, "Steam Turbine Technology Heats Up", PEI Magazine, Apr. 2003, p. 77, 79, 81.
Riaz et al., "Dovetail Attachment for Use With Turbine Assemblies and Methods of Assembling Turbine Assemblies," U.S. Appl. No. 11/941,751, filed Nov. 16, 2007, Patent Application, 16 pages.
Slepski et al., "Steam Turbine Rotating Blade," U.S. Appl. No. 11/778,180, filed Jul. 16, 2007, Patent Application, 11 pages.
Demania et al., "Low Pressure Section Steam Turbine Bucket," U.S. Appl. No. 12/037,346, filed Feb. 26, 2008, Patent Application, 15 pages.
Lee, Office Action Communication for U.S. Appl. No. 12/205,940 dated Aug. 11, 2011, 18 pages.
Jones, Notice of Allowance and Fee(s) Due for U.S. Appl. No. 12/205,942 dated Oct. 18, 2011, 13 pages.
Lee, Notice of Allowance and Fee(s) Due for U.S. Appl. No. 12/205,940 dated Nov. 29, 2011, 14 pages.

* cited by examiner

STEAM TURBINE ROTATING BLADE FOR A LOW PRESSURE SECTION OF A STEAM TURBINE ENGINE

CROSS REFERENCE TO RELATED APPLICATIONS

This patent application relates to commonly-assigned U.S. patent application Ser. No. 12/205,942 entitled "STEAM TURBINE ROTATING BLADE FOR A LOW PRESSURE SECTION OF A STEAM TURBINE ENGINE" and Ser. No. 12/205,940 entitled "STEAM TURBINE ROTATING BLADE FOR A LOW PRESSURE SECTION OF A STEAM TURBINE ENGINE", all filed concurrently with this application.

BACKGROUND OF THE INVENTION

The present invention relates generally to a rotating blade for a steam turbine and more particularly to a rotating blade with geometry capable of increased operating speeds for use in a latter stage of a low pressure section of a steam turbine.

The steam flow path of a steam turbine is generally formed by a stationary casing and a rotor. In this configuration, a number of stationary vanes are attached to the casing in a circumferential array and extend inward into the steam flow path. Similarly, a number of rotating blades are attached to the rotor in a circumferential array and extend outward into the steam flow path. The stationary vanes and rotating blades are arranged in alternating rows so that a row of vanes and the immediately downstream row of blades form a stage. The vanes serve to direct the flow of steam so that it enters the downstream row of blades at the correct angle. Airfoils of the blades extract energy from the steam, thereby developing the power necessary to drive the rotor and the load attached thereto.

As the steam flows through the steam turbine, its pressure drops through each succeeding stage until the desired discharge pressure is achieved. Thus, steam properties such as temperature, pressure, velocity and moisture content vary from row to row as the steam expands through the flow path. Consequently, each blade row employs blades having an airfoil shape that is optimized for the steam conditions associated with that row.

In addition to steam conditions, the blades are also designed to take into account centrifugal loads that are experienced during operation. In particular, high centrifugal loads are placed on the blades due to the high rotational speed of the rotor which in turn stress the blades. Reducing stress concentrations on the blades is a design challenge, especially in latter rows of blades of a low pressure section of a steam turbine where the blades are larger and weigh more due to the large size and are subject to stress corrosion due to moisture in the steam flow.

This challenge associated with designing rotating blades for the low pressure section of the turbine is exacerbated by the fact that the airfoil shape of the blades generally determines the forces imposed on the blades, the mechanical strength of the blades, the resonant frequencies of the blades, and the thermodynamic performance of the blades. These considerations impose constraints on the choice of the airfoil shape of the blades. Therefore, the optimum airfoil shape of the blades for a given row is a matter of compromise between mechanical and aerodynamic properties associated with the shape.

BRIEF DESCRIPTION OF THE INVENTION

In one aspect of the present invention, a steam turbine rotating blade is provided. The rotating blade comprises an airfoil portion. A root section is attached to one end of the airfoil portion. A dovetail section projects from the root section, wherein the dovetail section comprises a tangential entry dovetail. A tip section is attached to the airfoil portion at an end opposite from the root section. A cover is integrally formed as part of the tip section. The blade comprises an exit annulus area of about 18.1 $ft^2$ (1.68 $m^2$) or greater.

In another aspect of the present invention, a low pressure turbine section of a steam turbine is provided. In this aspect of the present invention, a plurality of latter stage steam turbine blades are arranged about a turbine rotor wheel. Each of the plurality of latter stage steam turbine blades comprises an airfoil portion having a length of about 12 inches (30.48 centimeters) or greater. A root section is attached to one end of the airfoil portion. A dovetail section projects from the root section, wherein the dovetail section comprises a tangential entry dovetail. A tip section is attached to the airfoil portion at an end opposite from the root section. A cover is integrally formed as part of the tip section. The plurality of latter stage steam turbine blades comprises an exit annulus area of about 18.1 $ft^2$ (1.68 $m^2$) or greater.

DETAILED DESCRIPTION OF THE INVENTION

At least one embodiment of the present invention is described below in reference to its application in connection with and operation of a steam turbine engine. Further, at least one embodiment of the present invention is described below in reference to a nominal size and including a set of nominal dimensions. However, it should be apparent to those skilled in the art and guided by the teachings herein that the present invention is likewise applicable to any suitable turbine and/or engine. Further, it should be apparent to those skilled in the art and guided by the teachings herein that the present invention is likewise applicable to various scales of the nominal size and/or nominal dimensions.

Figure 1:
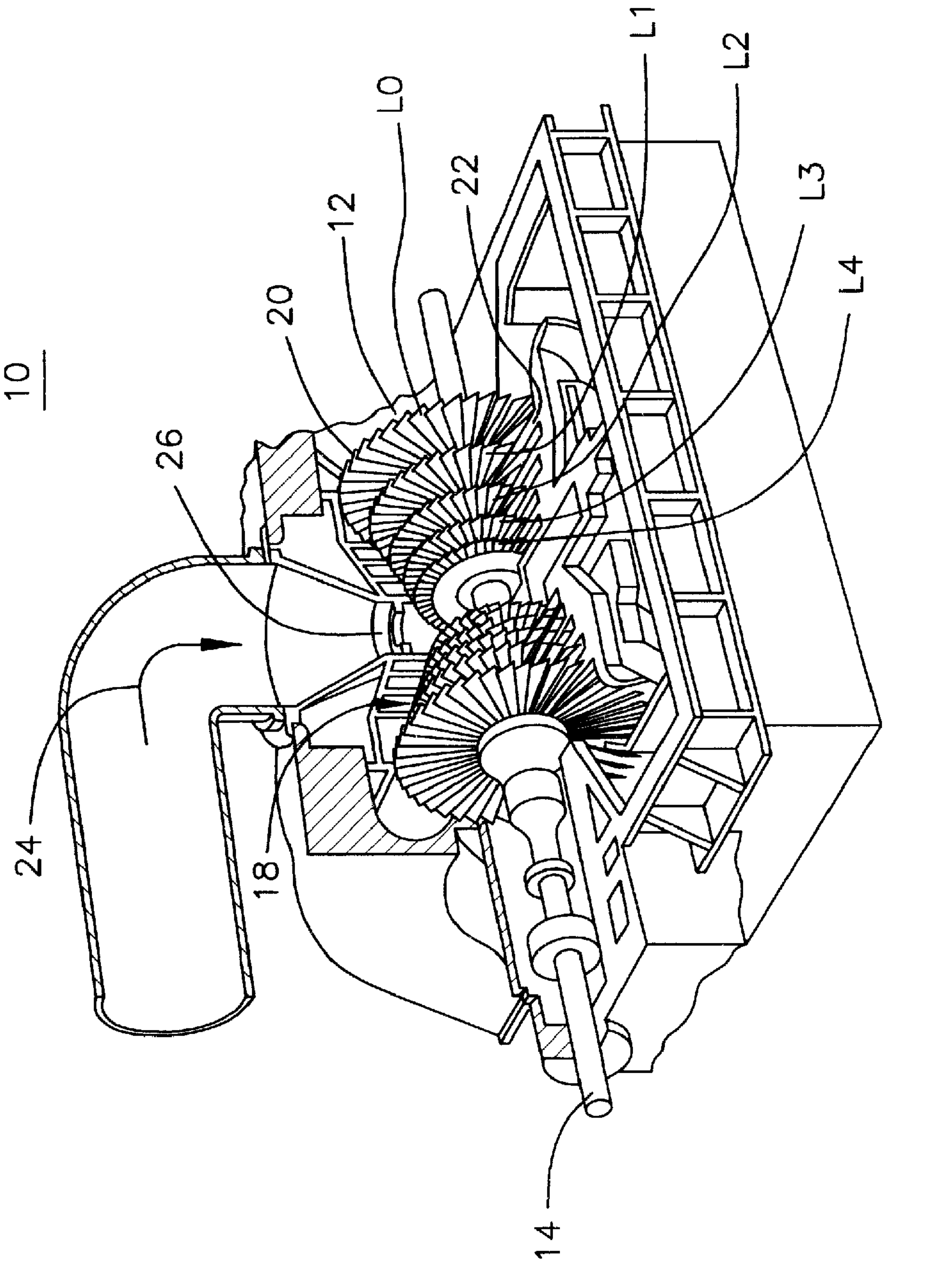
FIG. 1 is a perspective partial cut-away illustration of a steam turbine.

Referring to the drawings, FIG. 1 shows a perspective partial cut-away illustration of a steam turbine 10. The steam turbine 10 includes a rotor 12 that includes a shaft 14 and a plurality of axially spaced rotor wheels 18. A plurality of rotating blades 20 are mechanically coupled to each rotor wheel 18. More specifically, blades 20 are arranged in rows that extend circumferentially around each rotor wheel 18. A plurality of stationary vanes 22 extends circumferentially around shaft 14 and are axially positioned between adjacent rows of blades 20. Stationary vanes 22 cooperate with blades 20 to form a turbine stage and to define a portion of a steam flow path through turbine 10.

In operation, steam 24 enters an inlet 26 of turbine 10 and is channeled through stationary vanes 22. Vanes 22 direct steam 24 downstream against blades 20. Steam 24 passes through the remaining stages imparting a force on blades 20 causing shaft 14 to rotate. At least one end of turbine 10 may extend axially away from rotor 12 and may be attached to a load or machinery (not shown) such as, but not limited to, a generator, and/or another turbine. Accordingly, a large steam turbine unit may actually include several turbines that are all co-axially coupled to the same shaft 14. Such a unit may, for example, include a high pressure turbine coupled to an intermediate-pressure turbine, which is coupled to a low pressure turbine.

In one embodiment of the present invention and shown in FIG. 1, turbine 10 comprise five stages referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and a low pressure turbine can have more or less than five stages.

Figure 2:
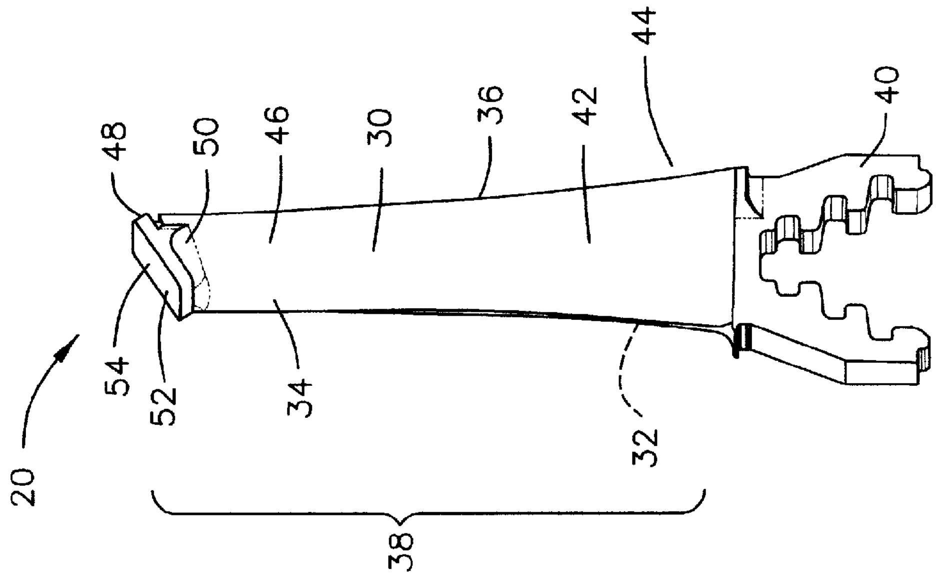
FIG. 2 is a perspective illustration of a steam turbine rotating blade according to one embodiment of the present invention.

FIG. 2 is a perspective illustration of a steam turbine rotating blade 20 according to one embodiment of the present invention. Blade 20 includes a pressure side 30 and a suction side 32 connected together at a leading edge 34 and a trailing edge 36. A blade chord distance is a distance measured from trailing edge 36 to leading edge 34 at any point along a radial length 38. In an exemplary embodiment, radial length 38 or blade length is approximately 12 inches (30.48 centimeters). Although the blade length in the exemplary embodiment is approximately 12 inches (30.48 centimeters), those skilled in the art will appreciate that the teachings herein are applicable to various scales of this nominal size. For example, one skilled in the art could scale blade 20 by a scale factor such as 1.2, 2 and 2.4, to produce a blade length of 14.40 inches (36.58 centimeters), 24.0 inches (60.96 centimeters) and 28.8 inches (73.15 centimeters), respectively.

Blade 20 is formed with a dovetail section 40, an airfoil portion 42, and a root section 44 extending therebetween. Airfoil portion 42 extends radially outward from root section 44 to a tip section 46. A cover 48 is integrally formed as part of tip section 46 with a fillet radius 50 located at a transition therebetween. As shown in FIG. 2, cover 48 is located at a compound angle with respect to tip section 46. In particular, cover 48 has a first portion 52 and a second portion 54 that extends over tip section 46 from leading edge 34 to a location that is a predetermined distance away from trailing edge 36. First portion 52 of cover 48 extends over pressure side 30 and second portion 54 of cover 48 extends over suction side 32.

In an exemplary embodiment, dovetail section 40, airfoil portion 42, root section 44, tip section 46 and cover 48 are all fabricated as a unitary component from a 12% chrome stainless steel material. In this embodiment, blade 20 is coupled to turbine rotor wheel 18 (shown in FIG. 1) via dovetail section 40 and extends radially outward from rotor wheel 18.

Figure 3:
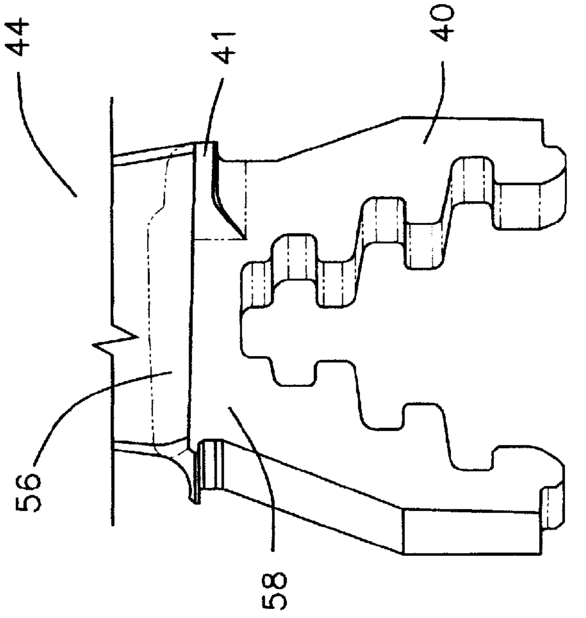
FIG. 3 is an enlarged, perspective illustration of a tangential entry dovetail of the steam turbine rotating blade depicted in FIG. 2 according to one embodiment of the present invention.

FIG. 3 is an enlarged, perspective illustration of a tangential entry dovetail of the steam turbine rotating blade depicted in FIG. 2 according to one embodiment of the present invention. In this embodiment, dovetail section 40 comprises a tangential entry dovetail that engages a mating slot defined in the turbine rotor wheel 18 (shown in FIG. 1). In one embodiment, the tangential entry dovetail includes a three hook design having six contact surfaces configured to engage with turbine rotor wheel 18 (shown in FIG. 1). The tangential dovetail is preferable in order to obtain a distribution of average and local stresses, protection during over-speed conditions and adequate low cycle fatigue (LCF) margins as well as accommodate airfoil root section 44. FIG. 3 also shows that dovetail section 40 includes a vane overhang 41 that accommodates the airfoil portion 42 on top of the dovetail platform 58. Those skilled in the art will recognize that the tangential entry dovetail can have more or less than three hooks.

In addition to providing further details of dovetail section 40, FIG. 3 also shows an enlarged view of a transition area where the dovetail section 40 projects from the root section 44. In particular, FIG. 3 shows a fillet radius 56 at the location where root section 44 transitions to a platform 58 of dovetail section 40.

Figure 4:
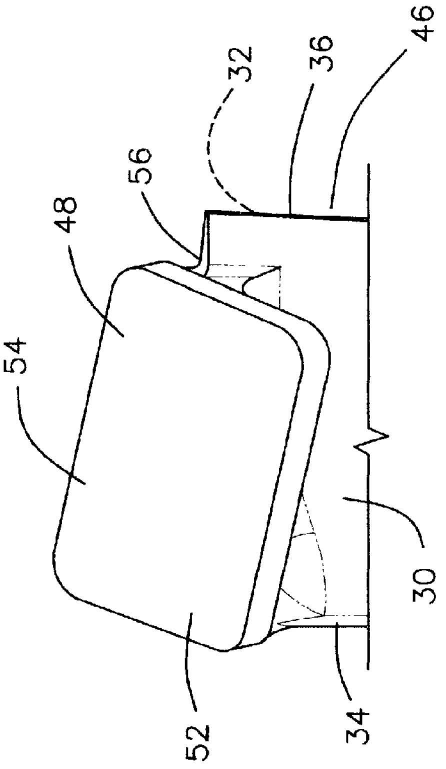
FIG. 4 is a more detailed view of a cover and tip section of the steam turbine rotating blade depicted in FIG. 2 according to one embodiment of the present invention.

FIG. 4 shows a more detailed view of cover 48 and tip section 46 of steam turbine rotating blade 20 depicted in FIG. 2 according to one embodiment of the present invention. As mentioned above, cover 48 is located at a compound angle with respect to tip section 46 such that cover 48 has a first portion 52 and a second portion 54 that extends over tip section 46 from leading edge 34 to a location 56 that is a predetermined distance away from trailing edge 36. In particular, first portion 52 of cover 48 extends over pressure side 30 and second portion 54 of cover 48 extends over suction side 32. Because cover 48 is located at a compound angle with respect to tip section 46, first portion 52 and second portion 54 appear as a flat surface when viewed from different angles.

Figure 5:
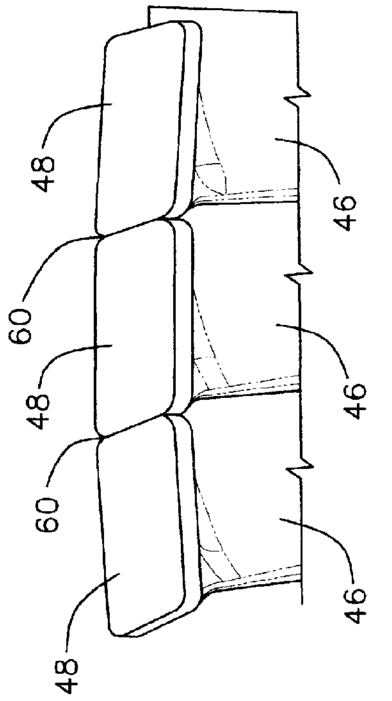
FIG. 5 is a perspective illustration showing the interrelation of adjacent covers from adjacent steam turbine rotating blades according to one embodiment of the present invention.

FIG. 5 is a perspective illustration showing the interrelation of adjacent covers 48 from adjacent steam turbine rotating blades according to one embodiment of the present invention. As shown in FIG. 5, there is interference 60 of about 0.005 inches (0.127 millimeters) between adjacent covers 48. Generally covers 48 are designed to have interference between adjacent covers, during initial assembly and/or at zero speed conditions. Interference 60 provides sufficient coupling at covers 48 at operating speed to achieve a desired frequency response. Also, as shown in FIG. 5, each cover 48 extends over a portion of an adjacent tip section of another blade after assembly. In particular, each cover will extend over the portion of an adjacent tip section of another blade where its cover does not extend fully over to its trailing edge.

As turbine rotor wheel 18 (shown in FIG. 1) is rotated, blades 20 begin to untwist. In particular, as the revolution per minutes (RPM) of blades 20 approach the operating level, the blades untwist due to centrifugal force and covers 48 become aligned with each other so that there is nominal interference with adjacent covers. The result is that the blades form a single continuously coupled structure. The interlocking cover provide improved blade stiffness, improved blade damping, and improved sealing at the outer radial positions of blades 20.

In an exemplary embodiment, the operating level for blades 20 is 3600 RPM, however, those skilled in the art will appreciate that the teachings herein are applicable to various scales of this nominal size. For example, one skilled in the art could scale the operating level by a scale factors such as 1.2, 2 and 2.4, to produce blades that operate at 3000 RPM, 1800 RPM and 1500 RPM, respectively.

The blade 20 according to one embodiment of the present invention is preferably used in an L2 stage of a low pressure section of a steam turbine. However, the blade could also be used in other stages or other sections (e.g., high or intermediate) as well. As mentioned above, one preferred blade length for blade 20 is about 12 inches (30.48 centimeters). This blade length can provide an L2 stage exit annulus area of about 18.1 ft$^2$ (1.68 m$^2$). This enlarged and improved exit annulus area can decrease the loss of kinetic energy the steam experiences as it leaves the L2 stage blades. This lower loss provides increased turbine efficiency.

As noted above, those skilled in the art will recognize that if the blade length is scaled to another blade length then this scale will result in an exit annulus area that is also scaled. For example, if scale factors such as 1.2, 2 and 2.4 were used to generate a blade length of 14.40 inches (36.58 centimeters), 24.0 inches (60.96 centimeters) and 28.8 inches (73.15 centimeters), respectively, then an exit annulus area of about 26.01 $ft^2$ (2.42 $m^2$), 72.26 $ft^2$ (6.71 $m^2$), and 104.05 $ft^2$ (9.67 $m^2$) would result, respectively.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A steam turbine rotating blade, comprising:

an airfoil portion;

a root section attached to one end of the airfoil portion;

a dovetail section projecting from the root section, wherein the dovetail section comprises a tangential entry dovetail;

a tip section attached to the airfoil portion at an end opposite from the root section;

a cover integrally formed as part of the tip section, wherein the cover is located at a compound angle with respect to the tip section, the cover comprising a first portion and a second portion that extends over the tip section from a leading edge of the blade to a location that is a predetermined distance away from a trailing edge of the blade, the first portion of the cover extending over a pressure side of the airfoil portion and the second portion of the cover extending over a suction side of the airfoil portion; and wherein the blade comprises an exit annulus area of about 18.1 $ft^2$ (1.68 $m^2$) or greater.

2. The steam turbine rotating blade according to claim 1, wherein the tangential entry dovetail comprises a three hook design having six contact surfaces configured to engage with a turbine rotor wheel.

3. The steam turbine rotating blade according to claim 1, wherein the blade has an operating speed that ranges from about 1500 revolutions per minute to about 3600 revolutions per minute.

4. The steam turbine rotating blade according to claim 1, wherein the airfoil portion comprises a length of about 12 inches (30.48 centimeters) or greater.

5. The steam turbine rotating blade according to claim 1, wherein the blade operates as a latter stage blade of a low pressure section turbine.

6. The steam turbine rotating blade according to claim 1, wherein the blade comprises a 12% chrome stainless steel material.

7. The steam turbine rotating blade according to claim 1, further comprising a first fillet radius located at a first transition area where the dovetail section projects from the root section.

8. The steam turbine rotating blade according to claim 1, further comprising a second fillet radius located at a second transition area where the cover is integrally formed with the tip section.

9. A low pressure turbine section of a steam turbine, comprising:

a plurality of latter stage steam turbine blades arranged about a turbine rotor wheel, wherein each of the plurality of latter stage steam turbine blades comprises:

an airfoil portion having a length of 12 inches (30.48 centimeters) or greater;

a root section attached to one end of the airfoil portion;

a dovetail section projecting from the root section, wherein the dovetail section comprises a tangential entry dovetail;

a tip section attached to the airfoil portion at an end opposite from the root section;

a cover integrally formed as part of the tip section, wherein the cover is located at a compound angle with respect to the tip section, the cover comprising a first portion and a second portion that extends over the tip section from a leading edge of the blade to a location that is a predetermined distance away from a trailing edge of the blade, the first portion of the cover extending over a pressure side of the airfoil portion and the second portion of the cover extending over a suction side of the airfoil portion; and wherein the plurality of latter stage steam turbine blades comprises an exit annulus area of 18.1 $ft^2$ (1.68 $m^2$) or more.

10. The low pressure turbine section according to claim 9, wherein the plurality of latter stage steam turbine blades operate at a speed that ranges from about 1500 revolutions per minute to about 3600 revolutions per minute.

11. The low pressure turbine section according to claim 9, wherein the covers of the plurality of latter stage steam turbine blades are assembled with nominal interference with adjacent covers.

12. The low pressure turbine section according to claim 9, wherein the covers for the plurality of latter stage steam turbine blades form a single continuously coupled structure.

13. The low pressure turbine section according to claim 9, wherein each of the plurality of latter stage steam turbine blades comprises a first fillet radius located at a first transition area where the dovetail section projects from the root section.

14. The low pressure turbine section according to claim 9, wherein each of the plurality of latter stage steam turbine blades comprises a second fillet radius located at a second transition area where the cover is integrally formed with the tip section.

* * * * *